US012331521B2

(12) United States Patent
Martins

(10) Patent No.: US 12,331,521 B2
(45) Date of Patent: *Jun. 17, 2025

(54) POROUS WATER FILLED CONSTRUCTION ELEMENT

(71) Applicant: KVC Finance OÜ, Tallinn (EE)

(72) Inventor: Johanna Martins, Espoo (FI)

(73) Assignee: KVC FINANCE OÜ, Tallinn (EE)

( * ) Notice: Subject to any disclaimer, the term of this patent is extended or adjusted under 35 U.S.C. 154(b) by 0 days.

This patent is subject to a terminal disclaimer.

(21) Appl. No.: 18/753,156

(22) Filed: Jun. 25, 2024

(65) Prior Publication Data

US 2024/0344322 A1    Oct. 17, 2024

Related U.S. Application Data

(62) Division of application No. 18/124,315, filed on Mar. 21, 2023, now Pat. No. 12,044,009.

(30) Foreign Application Priority Data

Mar. 22, 2022    (FI) ........................................ 20225252

(51) Int. Cl.
*E04C 2/00*    (2006.01)
*E04B 1/00*    (2006.01)
(Continued)

(52) U.S. Cl.
CPC ............ *E04C 2/525* (2013.01); *E04B 1/0023* (2013.01); *E04B 1/76* (2013.01); *F24S 10/80* (2018.05); *F24S 20/66* (2018.05)

(58) Field of Classification Search
CPC ...... F24F 5/0089; F24F 5/0003; F24F 5/0075; F24F 11/0012; F24F 2011/0013; F24F 2221/17; E04B 1/74; E04B 1/76; E04B 1/0023; E04B 2/86; E04B 2/30; E04B 1/7612; E04F 13/074; E04F 2290/023; E04F 13/0869; F24D 3/14; F24D 3/147; F24D 19/1009; F24D 2220/006;
(Continued)

(56) References Cited

U.S. PATENT DOCUMENTS 3,897,820 A    8/1975  Teeter, Jr.
4,122,356 A    10/1978 Decker
(Continued)

FOREIGN PATENT DOCUMENTS

CN    113454399 A    9/2021
DE    102008033398 A1    2/2010
WO    2016071864 A1    5/2016

OTHER PUBLICATIONS

European Search Report issued in European Patent Application No. 23 16 2296 dated Aug. 2, 2023.
(Continued)

*Primary Examiner* — Travis Ruby
(74) *Attorney, Agent, or Firm* — NIXON & VANDERHYE

(57) ABSTRACT

A construction element of a null-energy system includes a body on which the construction element can further include a porous material compartment with porous material to store water and evaporate the stored water outwards from the porous material through a holding layer on the opposite side of the porous material compartment to the body. The null-energy system uses a construction element of null-energy system as embodied therein.

8 Claims, 5 Drawing Sheets

Figure 1:
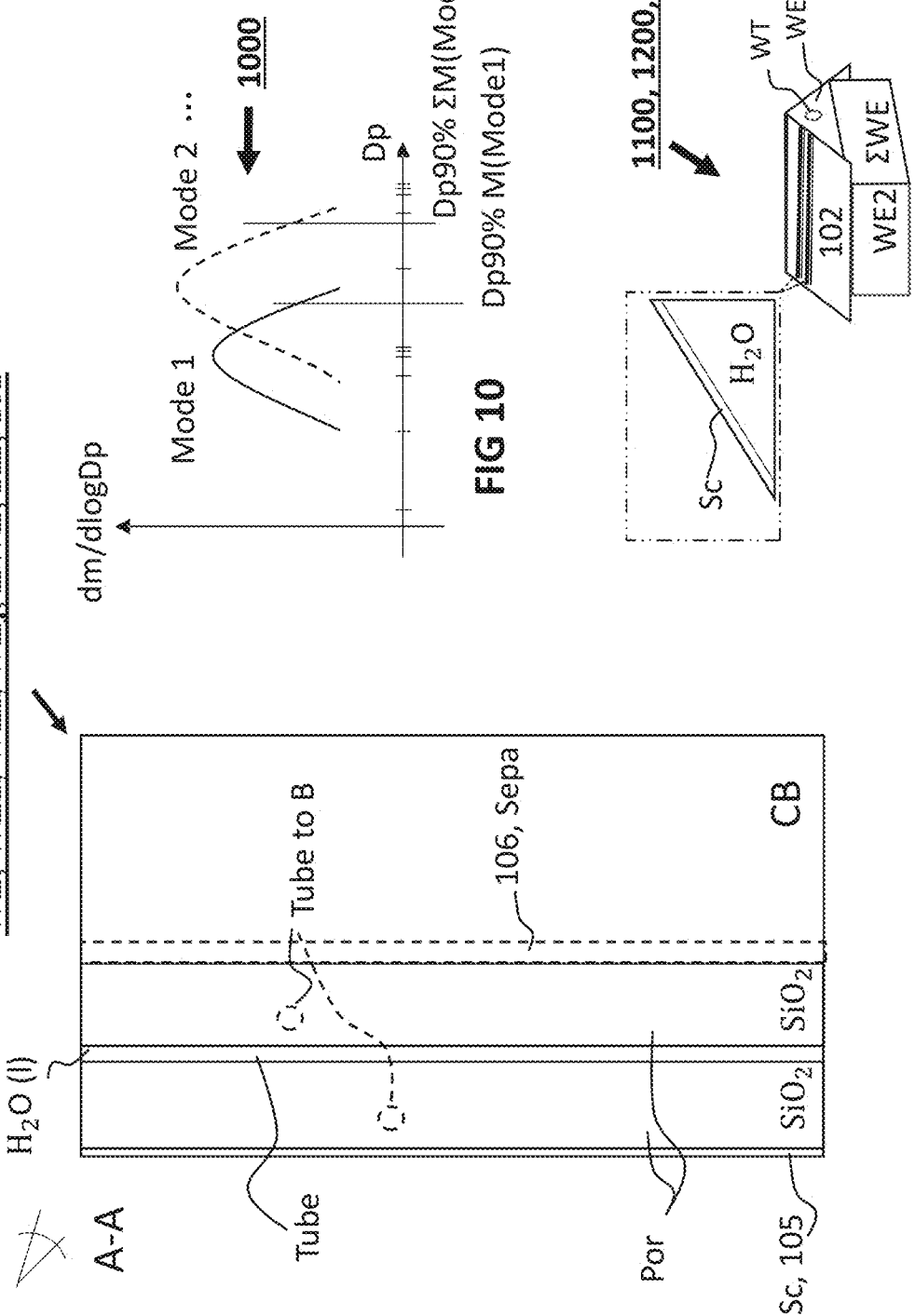

(51) Int. Cl.
  *E04B 1/76*  (2006.01)
  *E04C 2/52*  (2006.01)
  *F24S 10/80*  (2018.01)
  *F24S 20/66*  (2018.01)

(58) Field of Classification Search
  CPC ....... F24D 2220/10; F24D 5/10; F24J 2/0444; F24J 2/32; F28D 15/02; E04C 2/525; F24S 20/66
  See application file for complete search history.

(56) References Cited

U.S. PATENT DOCUMENTS

| | | |
|---|---|---|
| 4,143,703 A | 3/1979 | Creswick |
| 4,328,652 A | 5/1982 | Naumovich, Jr. |
| 5,561,958 A | 10/1996 | Clement |
| 10,697,174 B1 | 6/2020 | Bomberg |
| 10,955,156 B1 | 3/2021 | Kreuger |
| 2008/0086981 A1 | 4/2008 | Kilkis |
| 2010/0199975 A1 | 8/2010 | Bailey |
| 2011/0258945 A1 | 10/2011 | Arbour |
| 2012/0266553 A1 | 10/2012 | Shiao |
| 2015/0308697 A1 | 10/2015 | Berchtold |
| 2018/0224137 A1 | 8/2018 | Stein |
| 2020/0326136 A1 | 10/2020 | Nakamura |

OTHER PUBLICATIONS

Office Action for FI Application No. 20225252 dated Oct. 6, 2022, 6 pages.
Search Report for FI Application No. 20225252 dated Oct. 6, 2022, pages, 1 page.
Communication of Acceptance, issued in Finnish Application No. 20225252 dated Jan. 15, 2024.
U.S. Appl. No. 18/124,315, filed Mar. 21, 2023.

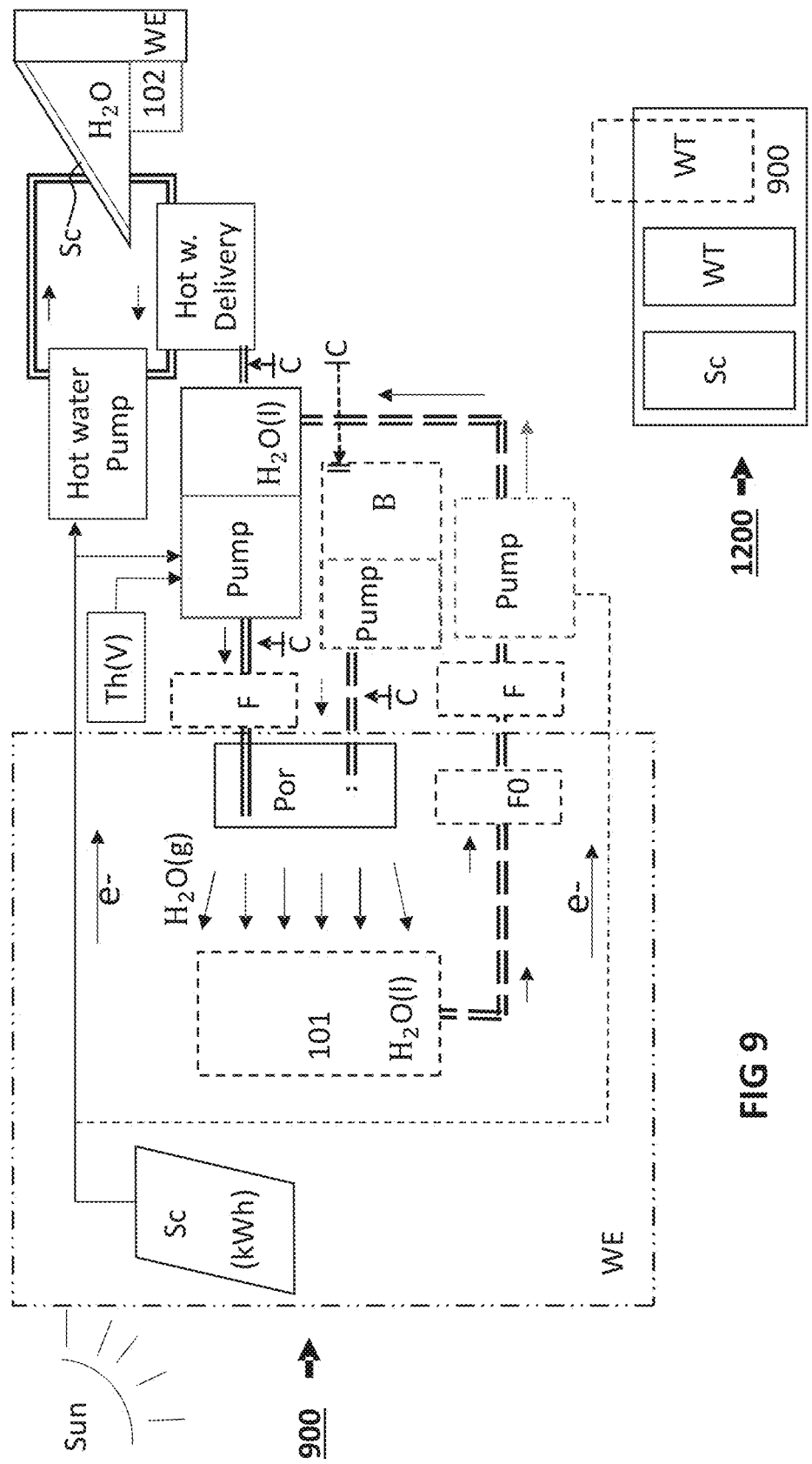

POROUS WATER FILLED CONSTRUCTION ELEMENT

CROSS REFERENCE TO RELATED APPLICATIONS

This application is a Divisional of application Ser. No. 18/124,315, filed on Mar. 21, 2023, which claims priority under 35 U.S.C. § 119 (a) to Application No. 20225252, filed in Finland on Mar. 22, 2022, all of which are hereby expressly incorporated by reference into the present application.

FIELD OF THE INVENTION

In very general level the presented invention relates to a construction element structure and a construction element comprising such a structure. In particular, the presented invention pertains to a preamble part of an independent claim directed to a construction element of a null-energy system comprising such an embodied construction element being used in the null-energy system according to the preamble part of an independent claim directed to such a null-energy system using such an embodied construction element having such an embodied structure.

BACKGROUND

Water is an interesting and important substance in the nature. Accordingly water has a crucial role in the world, to provide an energy transfer mechanisms in the climate in global as well as in in local manner, even in a spotted manner, to store and carry in transfer the received energy, received lastly from the Sun as solar irradiation, to the atmosphere and the water bound energy being stored and released according to the environmental condition at the location and scale under consideration.

In certain sense, the natural nuclear fusion energy of the Sun that is received to the closed system of Earth, is stored and transferred as well as dispersed in a manner, in which water has an important role.

Similar kind of a material circulation as water cited above, there has been certain fluids, as used as circulation fluids in cryogenic devices for example, to transfer heat from one location, called as a cold end, to another location called as a hot end, to provide a cold space to the cold end where the heat is taken into a circulation fluid to be carried, which heat is then transferred to another location by the circulation fluid, where the circulation fluid is releasing the taken heat from the first mentioned cold end location, to the another location, at the hot end, where the heat is dissipated and the circulating fluid is pumped back to the first mention location to take and carry more heat to be dissipated, to the hot-end of such a circulating system. Such heat pumps can be built with one or two circulations as such with many variants. However, the circulation is maintained by a pump whose operation is consuming some energy. Nevertheless, the amount of the heat taken by such a heat pump from the cold end, being transported to the warm, hot end, may be considerably higher than the energy needed to maintain the circulation of the circulating fluid as such, which circulation maintaining energy being taken from electricity delivery net for the maintenance of the circulation.

However, the maintaining of such a circulation as such needs an external but artificial energy source connected, such as an external electricity net, to maintain such a circulation by the actuators. It is also crucial that the circulation does not consume/loose the circulation fluid, that may have damaging influence to the human beings at the area of such a leak or loss, as well as to the nature, but in addition such circulation fluid would be very expensive, if being leaked away from the circulation and re-filled frequently beyond the natural system bound marginal losses. Accordingly, the circulation fluids can be special kind of chemicals, that do not exist in their used form in the nature, or, may be hazardous to the human beings and/or to the ozone layer as such, or further contribute to the global climate problems directly or in a catalytic manner, which are all problematic issues relating to the use of such chemicals.

This is highlighted especially in population rich areas, which are quite often in warm areas that suffer very hot climate, where the need of heat pumps would be needed and the use is about to be an increasing trend, and the need would extend to the areas where there were the need, but not yet no electricity available, or only arbitrarily.

SUMMARY OF THE INVENTION

The objective of the embodiments of the invention according to the presented disclosure is, to at least alleviate the problems described hereinabove, not satisfactorily solved by the known circulation fluid chemicals, operational/use aspects of heat pumps with such circulation fluid and arrangements thereof, and to provide a feasible solution, to provide also energy savings by the embodied simple structures of the embodiments disclosed in the present disclosure.

The aforesaid objective(s) are achieved according to the presented invention as claimed in an independent claim directed to a construction element of a null-energy system, provided by the embodied construction element structure, to be used as a construction element of a null-energy system as claimed in an independent claim directed to such a null-energy system that is using an embodied construction element according to the disclosure of the embodiments of the invention.

Water, as an important substance, for the operation of an embodied null-energy system according to the present disclosure, has been considered in the following as such. Water has a large specific heat capacity to store and release heat depending on the prevailing conditions in the environment, where the water in question is present and can have a concentration gradient dependent on the temperature and the phase.

In addition to the capability to accumulate and release heat energy, water as substance has latent heats, which are related to the phase transitions between the phases of solid (phase, i.e. ice) and liquid (phase) as well as to phase transition between liquid (phase) and gaseous (phase). The word "phase" has been written in parentheses to indicate that the preceding word as in the abbreviation with the preceding word should be considered as to denote to the phase in question expressed by the word liquid gaseous or solid.

In the present disclosure of embodiments, gaseous phase water is called water vapour, and such a dispersion that comprises such just called water vapour and/or air with a liquid phase droplets of water, so forming a dispersion comprising two phases, independently on the droplet size, from just nucleated water clusters to light rain droplets, is called mist. In particular, a water vapour as such is addressed to denote gaseous phase water.

Such gaseous phase water, water vapour, can be part of a mist, where the water can have phases of liquid in the droplets and gaseous phase water (the latter as water vapour). The partial pressure of the water vapour is dependent on the amount of the water in the (unit) volume under observation in that phase. In addition, in particular conditions of pressure and temperature, the conditions of saturation partial pressure of the water vapour is defined via the prevailing air pressure and temperature, in the considered volume.

Impurities in air under the ambient conditions or space of a room are not accounted, although may have a contribution to the mist formation from water vapour, even in normal level of locality in the air, indoor and/or outdoor, at the altitude with the corresponding temperature and ambient pressure.

A construction element of a null-energy system (also as a construction element for brevity) according to the present disclosure is characterised in that the construction element comprises a body on which the construction element further comprises a porous material compartment with porous material to be situated to store water, to be evaporated as water vapour outwards from said porous material through a holding layer on the opposite side of the porous material compartment to said body. According to an embodiment such a construction element of a null-energy system is considered as a construction element of a null-energy system as the construction element is embodied as a self-cooling construction element, that does not need external energy for the cooling itself, although the energy for the coolant pumping can be produced on-site at the elements themselves, without the need to use external artificial energy sources such as external artificial electricity nets.

The porous material is used to provide a capillary transference of the water in the porous material compartment in a equalising manner in respect to the water content, as well as provide a natural passive suction maintained by the evaporation of the water through the holes and/or the pores through the holding layer, to hold the porous material in the porous material compartment.

According to an embodiment variant the porous material comprises sand, which has size distribution to provide sand particles below a threshold particle size, to provide capillary transference of the water in the porous material. The size distribution to match to dedicated environmental conditions can be selected according to the threshold particle sizes and the distribution adjustment by sand fraction in certain modes comprising sand with mode specific size distribution.

Alternatively, or in supplement, at least some part of the sand can be replaced by a solid but porous sintered material, consisting of sintered granules in form of a unite plate, to hold the water and to deliver the water accordingly in similar way as the sand as embodied. Such embodiments can be mechanically stronger than embodiments using mere sand as the porous material. So, the construction element thickness can be made thinner with use of such a porous plate structure in the porous material compartment, which is advantageous, for example in embodied ceiling or roof structures, but also at the boarders of construction elements.

According to an embodiment variant, additionally a holding layer can comprise such sintered material as unite plate. According to a further embodiment the holding layer can be made of perforated material. Perforated material can comprise metal in plate or layer, such as for example aluminum, copper, steel, or brass.

According to an embodiment variant, perforated metal parts can be used on sintered material plates made of porous material as embodied. According to an embodiment variant the perforated metal parts can be set as bands or shaped areas on the construction element's outer surface.

According to an embodiment variant the holding layer can have a layer of solar cells in a solar cell configuration, to provide solar energy to be used in the null-energy system.

According to an embodiment, the embodied construction element has a body being made of concrete or another water-permeable material. The body can be reinforced by aluminum, steel or iron, and the reinforcement can have an anti-corrosion agent coating to preserve the reinforcement operational in the concrete environment.

However, according to an embodiment variant the construction element can have on the body surface a second holding layer, to separate the porous material compartment from the body, so to hold water as a molecule sieve to provide one direction transfer through the body for the water vapour, from the body towards and into the porous material in the porous material compartment.

According to an embodiment variant, the second holding layer can be embodied to hold water not to go through the body by a water resistant material spread throughout to the body to stop the water penetration in practice, so to provide a humidity transference stop from the body side of the construction element to the construction element's other parts and through it. The humidity transference stop can be embodied in product forms of wall elements as well as in roof elements to stop the water transference backwards through the body, i.e. to the room or space to be cooled, even to stop the water backwards flux in liquid form and as water vapour.

According to an embodiment an embodied construction element has in the porous material compartment additionally at least one water supply channel or piping arrangement to supply liquid water, into the porous material compartment with the porous material therein, being fed from a water reservoir. According to an embodiment variant, the water delivery is implemented by a pump and/or pump system with a filter, the pump being controlled by thermostat in a volume to be cooled by the evaporative water from the porous material compartment of the construction element. According to an embodiment, such a thermostat can be embodied to be mounted into a thermostat volume being preserved into an embodied construction element, but alternatively on to a surface of construction element embodied in question, preferably on the body-side surface. According to an embodiment the porous material compartment can comprise a temperature sensor in the porous material, so to provide temperature values as readings to the thermostat to be used in the controlling. Accordingly, the temperature difference can be obtained and used in applicable extent in the controlling of the pumps.

According to an embodiment, an embodied construction element can have surfaces that can be occupied by solar cells of a solar cell configuration on said construction element surface. According to an embodiment variant, such solar cells can be mount on the construction element surface in a planar manner, or on a reclined lip structure towards a direction of expected sun light maximum.

According to an embodiment variant the solar cells can be on a Solar heater piping on the construction embodiment variant as such, and/or on reclined surface of the piping on an embodied construction element, such as a roof or wall construction element, to be reclined towards the direction of expected (maximum) level of sunshine.

According to an embodiment the construction element can have such a holding layer that comprises an ensemble of pores being arranged to provide a passage for the evaporative water ($H_2O(g)$) through said pores through the holding layer.

According to an embodiment the construction element can have such a lip that operates as a substrate to hold an ensemble of solar cells, to provide a reclined surface for said solar cells to be directed towards the Sun.

According to an embodiment, the construction element can have such an embodied lip that can have at opposite side of the solar cell side, a condensation surface to catch, save, and/or channel evaporating water to condense onto said opposite lip surface. In some embodiments some of the water can be thus caught and sent back to the water reservoir.

According to an embodiment the construction element that can have such a lip, can provide screening by such a lip as a screening lip, with such a surface that comprises a channel or tubular formation for water feedback, so partially to circulate condensed water underneath the solar cell surface, so in addition also to cool the solar cell by taking heat to the circulating water.

A null-energy system according to the present disclosure is a cooling system. According to an embodiment the null-energy system is a cooling system of an entity made of an ensemble of construction elements, such as a building or a part thereof, for example.

According to the present disclosure the embodied null-energy system comprises an ensemble of embodied construction elements according to present disclosure, a pump for water delivery via a water piping in liquid form to the porous internal material in the porous material compartment comprising porous material, and a thermostat to control of the pump operation. According to an embodiment the system can have an additional pump for the anti-microbe agent delivery system, to provide the anti-microbe agent to the connected construction elements. According to an embodiment variant the anti-microbe agent can be dosed into the water reservoir.

According to an embodiment of the present disclosure, anyone of the embodied pumps is regarded as an element of embodied null-energy system, to be energized by a solar cell configuration in the assembly. According to an embodiment the solar cell configuration can comprise solar cells on an ensemble of construction elements diversified to different parts of the entity made of said construction elements. According to an embodiment the embodied null-energy system can have an external to the entity as such, but on the site (and so considered as an intrinsic element), a solar cell configuration on the site, to provide electricity to the pump. Solar cell configuration as such can be a ready-to-use configuration, when the solar cells are connected to the solar cell configuration, with the required electronics as such for the conversion of the solar irradiation to electricity. According to an embodiment the null-energy system can comprise an ensemble of solar cells to provide electricity to at least one pump of the pumps of the null-energy system.

According to an embodiment, the null-energy system can have an anti-microbe agent delivery system comprising an anti-microbe agent reservoir, pump and piping for the delivery, the reservoir being connected by the piping to the porous compartment of the construction elements to be protected by the anti-microbe agent. According to an embodiment variant, some parts of an entity built by the embodied construction elements can comprise such construction elements in which the porous material has already processed to comprise such an anti-microbe agent, to be used in combination with such construction elements that has the delivery system piping therewith in the structure to provide the piping.

According to an embodiment the null-energy system can comprise a filter to filtrate the water to be delivered and/or partially circulated back to the use. The filters can be positioned to the system near the pump, according to an embodiment variants to one side (suction or pressure side) or both sides. According to an embodiment variant, the pump as the system element is controlled to compensate the pressure loss over the filters in the water delivery system, in order to keep the evaporation in constant pre-set manner, independently on the filter clogging, so dynamically adjusting the pumping to keep the water yield at the porous material compartments in question in set value.

According to an embodiment variant the null-energy system can comprise an end-piece channel to provide fluid passage, to be embodied as an air way at an end of an ensemble of construction elements forming an entity of them, to lead air and water or water vapour between construction members of said ensemble. Such channel can be used in feeding water in liquid form as a spare channel in the system, and/or to equalise the water content in the porous material.

According to an embodiment, sand is used as the porous material in the porous material compartment in the embodied construction element as well as in entities using such construction elements.

According to an embodiment the sand as the porous material is quartz sand ($SiO_2$), which is inert and resistant to different conditions with moisture and temperature. However, as an option, sintered solid granular material which is having porous structure can be used in suitable part where applicable, in addition or option to sand, as the porous material in the porous material compartment of the embodied construction elements.

In the present disclosure, the expression "a number of" refers herein to any positive integer starting from one (1), e.g. to one, two, or three. Accordingly, the expression "a plurality of" refers herein to any positive integer starting from two (2), e.g. to two, three, or four.

In an ensemble there can be a number of items that are present in the ensemble.

The expression "to comprise" as such as well as in its deflected forms has been used as an open expression.

Different embodiments of the present invention are disclosed in the dependent claims.

BRIEF DESCRIPTION OF THE RELATED DRAWINGS

In the following, embodiments of the invention according to the present disclosure are described in more detail with reference to the examples shown in the appended drawings in which FIG. 1 illustrates examples of embodiments according to the present disclosure, FIGS. 2 to 8 each illustrate further examples of embodiments according to the present disclosure, FIG. 9 illustrates an embodied null-energy system according to the present disclosure utilising an embodied construction element disclosed in the present disclosure, FIG. 10 illustrates characteristics of porous material to be used in the embodiments of the present disclosure, FIG. 11 illustrates an entity being assembled from embodied null-energy system with an ensemble of embodied construction elements according to the present disclosure, and FIG. 12 illustrates an embodiment example on an optional null-energy system according to the present disclosure.

In the following detailed disclosure of examples of embodiments same reference numbers are used to same objects, which however do not need to be necessarily mutually identical, as a skilled person in the art knows from the context of the embodiments where such objects are shown.

DETAILED DESCRIPTION OF EXAMPLES OF THE EMBODIMENTS ACCORDING TO THE PRESENT DISCLOSURE

According to the present disclosure an embodied construction element comprises a water permeable porous material, which allows water passage through the porous material at least in gaseous form, but can provide a capillary transfer of the water in liquid form to soak the porous material throughout to the parts of porous material from the concrete body to the surface from which the evaporation is occurring. According to an embodiment such porous material is sand, especially in an embodiment variant quartz sand. Such sand can comprise a mode of small particles, which small particle mode comprising particles smaller (90% in diameter are smaller) than 100 um in diameter as in size, in the sand, so that the capillary phenomena can provide the water transference in the liquid form from the water delivery piping to the evaporating surfaces of the construction element.

According to an embodiment the particle size of the material is determined as an average mass basis, considered as a mass of the particle having as a threshold size. According to an embodiment 90% of the particle mass is below the threshold size. According to an embodiment the threshold size is between 400 and 2000 µm. According to an embodiment the threshold size is between 500 and 1000 µm. According to an embodiment variant, the threshold size is between 300 and 700 µm. According to a variant of an embodiment the threshold size is between 200 and 420 µm. According to an embodiment variant the threshold size if between 50 and 280 µm.

According to an embodiment variant the sand can comprise as incorporated to the sand particle size distribution various ensembles of fine sand particles as modes of particles that have a mode specific mass based threshold size of 90% of mass threshold, between 2 to 50 µm, or below 10 µm, for these modes as such.

According to an embodiment variant the indicated fine sand particles belonging to these modes are incorporated to the porous material to contribute for capillary forces to distribute the water by capillary mechanisms throughout the porous material embodied as sand.

According to an embodiment such a porous material is in grains. According to an embodiment variant, a fine dust, having modal size below 25 µm has been added to the porous material as capillary enhancing agent, so to improve the water distribution in the porous material in liquid form.

According to an embodiment the porous material is provided by sintered material, being obtained sintering an embodied sand, so to provide a porous structure to allow water to penetrate the porous structure in gaseous phase. Such a sintered material can be used as a plate to be added in the manufacturing of the construction element to provide a passage to water for evaporation and passage through such porous material as a material layer, in avoidance compression of the porous materials such as sands, which may compress in presence of rich vibrations, and can leave some parts of the porous material compartment without the porous material if sand being exposed to vibration without re-fill of the voids.

According to an embodiment variant such sintered porous material plates can be used to hold the sand, at the edges of the construction elements, to hold the sand but preserve the water passage through also at the edge regions.

According to an embodiment variant the plateaus porous materials and the embodied sands can be used in the same porous material compartment. In an embodiment variant, in layers series in a direction of water vapour flux, i.e. in its gaseous form flux, which is parallel to a direction of a normal of the holding layer forming piece surface. Such plate porous material would be useful, also especially in end wall-forming parts of the construction elements, to provide passage to the water vapour through the porous materials in/from the porous material compartments.

FIG. 1 illustrates in a schematic way an example of a construction element WE, WE2, WEi, WEj, WE, RE, 102 according to an embodiment of the present disclosure having illustrated structure in general, although the product form in shape, in the appearance and dimensions as well as shape can vary according to the intended use. Reference numeral WE as such is denoting to such an embodiment according to which the construction element is in product form of a brick or a like. The product form as a brick could be small brick such as used in bricks in building masonry, or the brick can be rectangular or curved rectangular, as in some chimney masonry. The size can be from few tens of centimetres to a meter, for example. The marking A-A is indicative to provide the cross-section plane, for indication of a view to the reader, as similar also in other product forms with the marking WE2, WEi, WEj, WE, RE, 102 indicative position. Product form as an element, RE and 102 each as such are denoting to roof elements, to provide for example a half or entire roof by the element. According to an embodiment of the present disclosure, the construction element in the named product forms comprise a body CB. The body CB is considered to be such a mechanical part in the structure to provide the main capacity to the mechanical bearing/loading, such as in the wall elements embodied as based to the construction element in its embodied product forms.

According to an embodiment, the body CB can be made of concrete, which can be reinforced by aluminum, steel and/or iron reinforcement, as well as anticorrosion agent on the reinforcement surfaces, being used as bars and/or nets situated into the body CB in the cast of the body when manufacturing. According to an embodiment the body CB can comprise also a water stop layer, so that the humidity cannot penetrate the body from any side of it. According to a variant of an embodiment, the body can be coated on one side by a material that operates as a molecule sieve, to allow one direction of water to penetrate out of the body, to the porous material in a ready construction element. The coating in such an embodiment forms a second holding layer (106, Sepa) between the porous material and the body CB, as illustrated in FIGS. 7 and 8.

Figure 7:
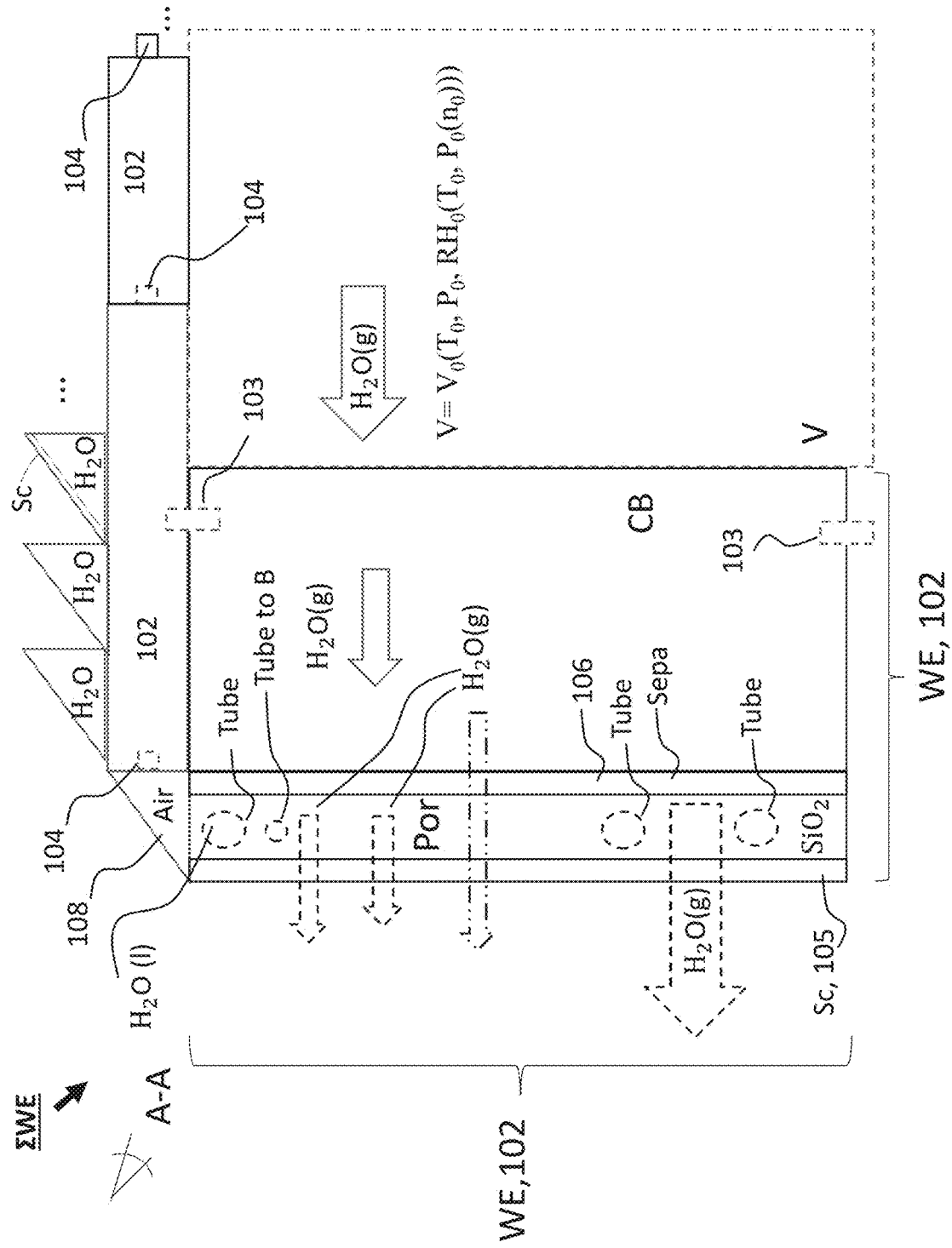
Figure 8:
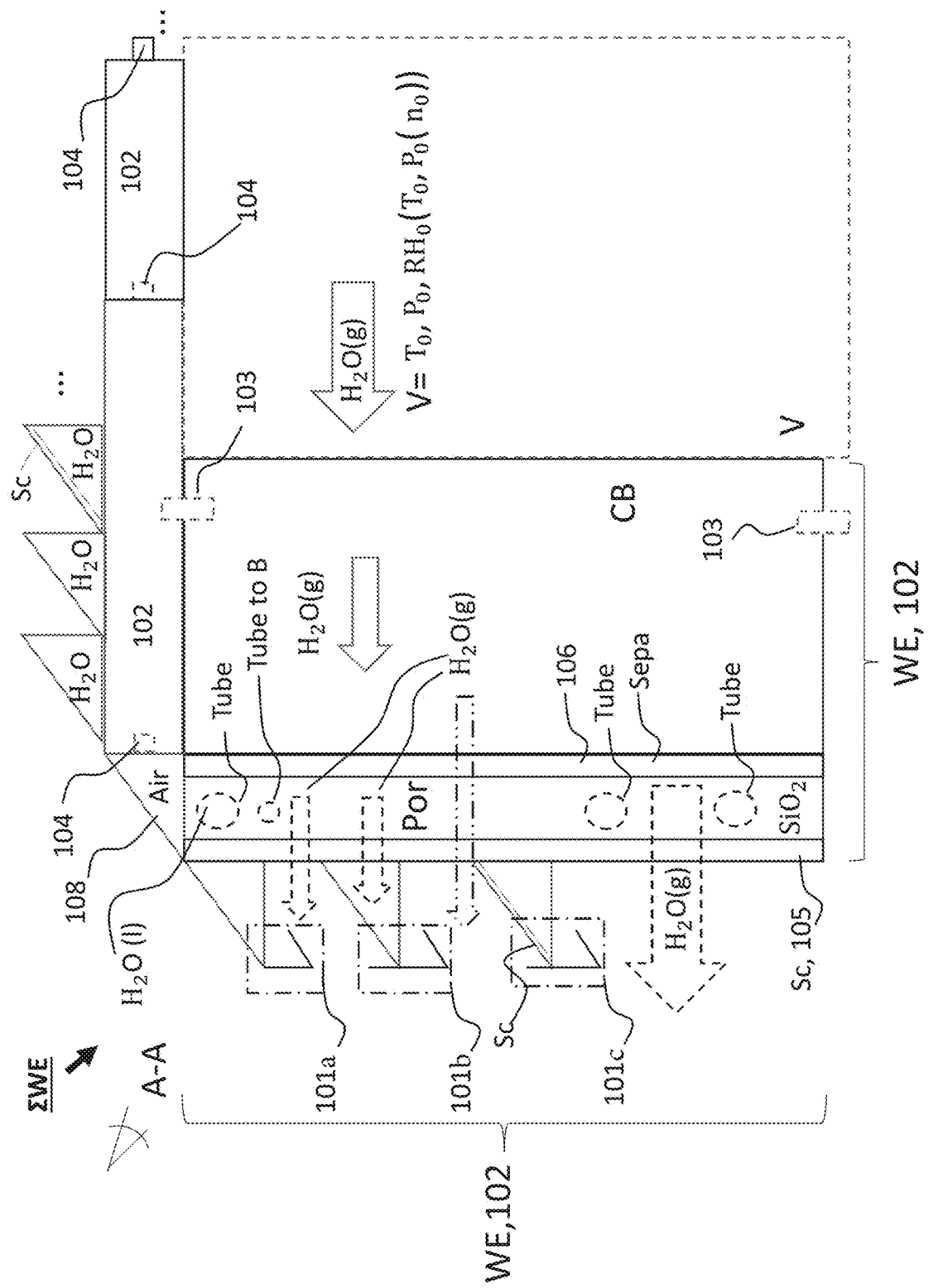

As illustrated in FIGS. 7 and 8, such a coating in an embodiment variant can form a molecular sieve to provide only one direction passage to the water, even as water vapor, from the body CB, not to the body CB. This alternative embodiment is illustrated the arrow 107 with the diagonal line to indicate the one-way molecular sieve property.

According to an embodiment the construction element in FIG. 1 example comprises also a porous layer Por, which can be formed in suitable part from sand, which can be embodied by quarts sand. The sand can be composed of several modes of sand particles, according to the sand particle sizes being illustrated by the modes as particular size distributions. According to an embodiment the porous layer can comprise also plate-like porous material forming a solid body, being formed from granular material being sintered together to form a porous structure as plate. Such plate-like porous material can be used at the end walls or edges of the construction element which have an assembly surface facing to other construction elements to form an entity of construction elements WE, such as a wall for example, to be formed from the construction elements WE like wall made of bricks. In such an embodiment, the porous material compartments are to be matched to form a unite porous material volume in the entity of construction elements.

According to an embodiment the construction element can comprise a holding layer 105 in the example of FIG. 1. The holding layer can be made of holding material, such as copper, aluminum, brass or steel to provide sufficient thermal conduction of the thermal energy from the outer side of the holding layer to the porous material in the porous material compartment in the construction element. According to an embodiment variant, also plastics can be used, within the provision that the thermal conductivity corresponds at least the thermal conductivity of a steel. Although porous material and the compartment for it are marked with the same reference number Por, the context is sufficient to a skilled person to identify the cited object which one is in question.

According to an embodiment example in FIG. 1, the construction element WE, WE2, Wei, WEj, WE, 102 RE comprises a channel or pipe, Tube, to conduct water in liquid form to the construction element, and especially to the porous material Por in the porous material compartment. The channel or pipe is arranged to provide water to the porous material, the water being distributed by capillary forces acting in the porous material, being assisted a water pump with an appropriate pressure to provide soaking throughout the porous material, so that the evaporating through the perforated holding layer can be started and continued. The position of the piping can be embodied as vertical to have the benefit of the gravity forced delivery to the pipes. Also, horizontal as well as diagonal, i.e. the elevation being between diagonal and horizontal can be used in the water delivery.

In the evaporation, the evaporating water is taking energy from the construction element side on which the perforation is provided as the passage for the water vapour, which in the evaporation consequently cools the construction element, first at the porous material side, but through energy transfer mechanisms to the concrete body, also the concrete in it and consequently at the free surface of the concrete body at the opposite side of the concrete body CB as the porous material compartment with the porous material Por. The concrete body as well as the porous material can operate also as cooling element capable to take heat energy via their surfaces to the cooled body from a room or space being cooled (cf. item V in FIGS. 7 and 8).

According to an embodiment the evaporation from the construction element surface through the perforation pores as well as the capillary forces in the porous material provide a pressure difference, which can be used in the water transference in the water providing piping in the null-energy system (cf. FIG. 9). A pump in such an embodied system can be used to provide rapid soaking of the porous material, so that the evaporation can start throughout the porous material side next to the perforated holding element 105.

According to an embodiment example in FIG. 1 the reference numeral 106 is indicative of a second holding layer 106, Sepa. The reference numeral Sepa is indicative of an embodiment to use the layer as a water vapor stopping layer, to operate as a water-insulation membrane, being positioned between the concrete body CB and the porous material layer Por, to prevent moisture diffusion to the concrete body CB from the porous material. According to an embodiment variant, the second holding layer 106 can comprise a layer that operates as the water vapor stop layer, or as a molecular sieve layer to prevent the water flux from the porous material layer Por to concrete body CB. In FIG. 1 the second holding layer 106 was drawn by dashed line to indicate that the material of the layer can be positioned as embodied to extend throughout the concrete body CB as water stop.

According to an embodiment any of the construction element example indicated in FIG. 1 can have in an optional embodiment a pipeline Tube to B, to be used in mold or other microbe resistant agent delivery piping. The piping can be positioned into the porous material compartment to cover the porous material so being protected against microbes. The number of such pipes is not limited as indicated by the dashed lines of the reference number.

According to an embodiment, any microbe resistant agents can be used as such, being deliverable through the pipes in liquid or gaseous form, from the reservoir (B, FIG. 9) to the porous material compartment as such. However, if for example from Boron-derived anti-microbe agents as embodied antimicrobe agents were somehow inappropriate to the environment of the embodied system, one feasible option to embody the anti-microbe agent would be the use of lemon and/or vinegar, which are two natural liquids that can prevent mold efficiently. Both, e.g. white vinegar solution and natural lemon are both fresh smelling solutions that can prevent mildew and mold growth. The anti-microbe agent can be added to the system by the pump and/or the valve (C) which can be controlled manually, and/or by a timer for example to provide automation for the adding.

Figure 2:
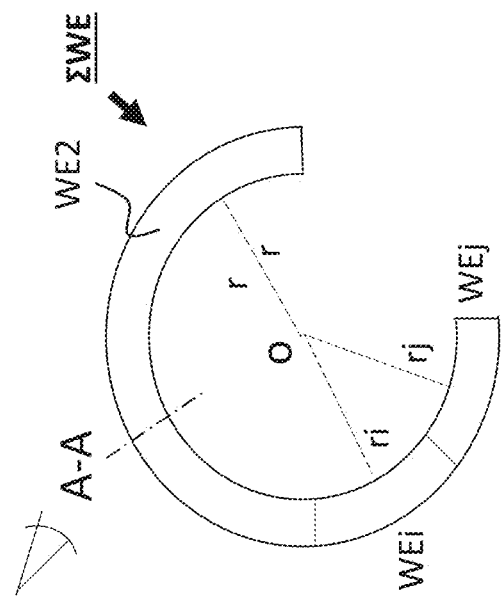

FIG. 2 illustrates in a schematic way an example of a construction element WE2 as a whole wall element in rectangular geometry of product form. The cross section A-A illustrates that the dashed line indicated plane would provide the same or similar cross section to the embodied wall element as an embodied construction element as indicated in FIG. 1 or as in FIG. 7 or FIG. 8, as elements of an embodied null-energy system forming such an entity as illustrated in the example of FIG. 11.

The reference numeral WE as a construction element with product form of a brick is indicative that such a construction element WE2 can be made from the construction elements WE, the dashed line indicative the optionality of the WE2 to be as an entity (also as EWE to indicate the character as an assembled product form) of construction elements WE as assembled together. However, the whole element WE2 can be made as a single construction element according to the structure of FIG. 1, 7 or 8. The formations 202 and 203 are embodied respectively as a window opening 202 and a door opening 203.

Figure 3:
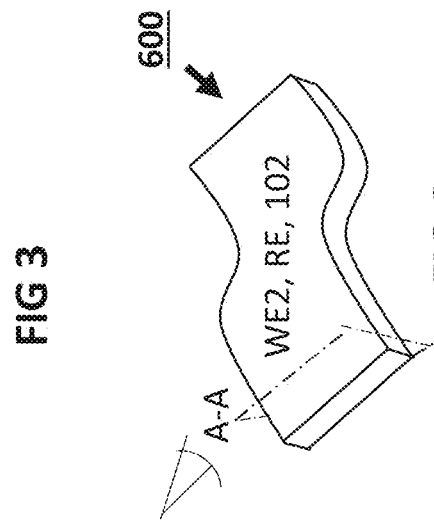

In FIG. 3 example of an embodiment, with the reference numeral EWE it is indicated a product form of construction element as an entity, composed of curved product form WE2 and curved product forms WEi and WEj. The curvature radius has been considered constant from the curvature center point, to follow a circular geometry. According to an embodiment variant the radius ri and rj does not need to be the same, although in the FIG. 3 they appear to be at least close.

However, circular construction element geometry of FIG. 3 give an example of a cone cut line form to be followed by the corresponding product forms of cone cut shape. Further product forms following cone cut form can be embodied with their curvatures of parable, hyperbole, ellipse or a combination thereof to provide an embodied product form for an embodied wall element with wall curvature in horizontal direction, while the vertical direction is straight in the sense embodied in the example of FIG. 5. The cross-section A-A is indicative of similar structure as in FIGS. 1, 7 and/or 8.

Figure 4:
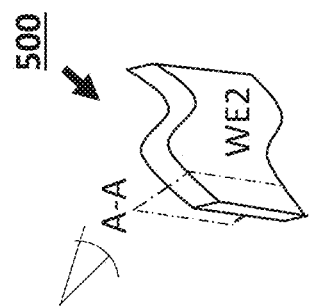

FIG. 4 is illustrative an example of a bunker-embodiment 400. In such an embodiment the entity 400 has been formed by curved structure to compose an arch or cove with the indicated cross section in the embodied construction element WE. According to an embodiment the bunker-embodiment 400 can be embodied as in a form of a cylindrical calot with the mantel to form the integrated outer wall and roof as indicated in the FIG. 4. The ends of the calot can be in plate like geometry by the suitable construction elements embodied with the outer line to match to the curvature of the mantel. The water feed can be separate to the mantel part and to the end part or parts but can be implemented by a common feed with appropriate branching.

According to an embodiment variant the construction elements WE in the bunker embodiment 400 can have curvature to two directions, so to provide an iglu-form variant as a segment of a sphere or a calotte, as above the ground surface. The marking RE in FIGs is referring to Roof Element as such, also in the integrated roof and wall with the elements to form the entity. According to an embodiment, it is also possible that planar roof elements 102 can be used at the top of such a bunker-400 or iglu-embodiments 400 of the construction element entity.

Figure 5:
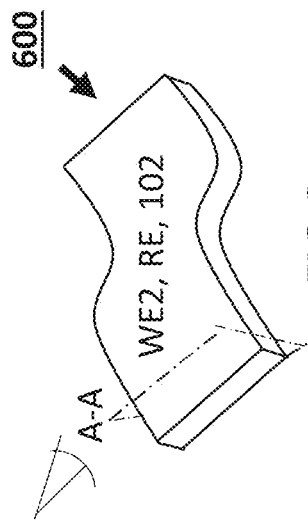

In FIG. 5 illustrates a double curved wall element WE2, 500 as embodied with the indicated cross section A-A (in accordance to FIGS. 1, 7 and/or 8).

Figure 6:
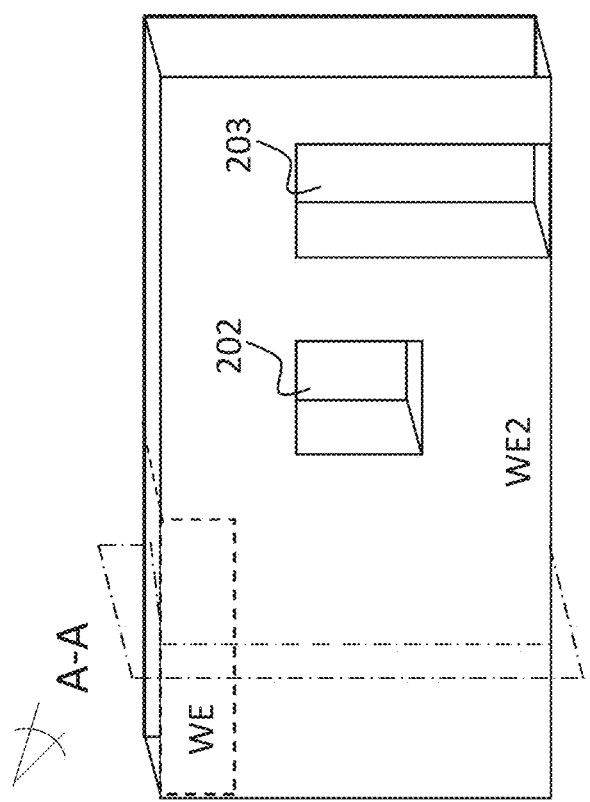

In FIG. 6 is illustrating a roof element RE, 102 with a double curvature 600, as embodied with the indicated cross section A-A (in accordance to FIGS. 1, 7 and/or 8). From the examples of FIGS. 5 and 6 a skilled person knows immediately that product form of the construction element WE as a wall element WE2, or as a roof element RE, 102 can be embodied also with curvature according to the designer's will to provide a customised construction elements WE to form an entity therefrom with desired curvature, to a desired number and curvature radius. A skilled person also knows from the embodiments, that curved construction elements can be manufactured with standardised sizes with the related dimensions and curvatures, being defined in detail specified by the manufacturer.

Example in FIG. 7 is illustrative of a construction element WE and a roof element 102 at a corner end, in accordance of the WE in FIG. 1, shown as in an example of an embodied entity, which is using the null-energy system according to the present disclosure as embodied. In the example, the corner indicated in the FIG. 7 is illustrative of a corner of such a closure to form a cooled space V, to be cooled by the construction element WE and/or 102 as a system element of an embodied null-energy system comprising an embodied construction element WE and/or 102. Such a volume V can be an interior volume of a building (FIG. 11), or a part thereof.

According to an embodiment a wall or a number of walls can be embodied by such a construction element in a building, according to the needs of cooling the parts with the volume V in the building as planned.

The marking $V=V_0(T_0, P_0, RH_0(T_0, P_0(n_0)))$ is indicative that the conditions in the volume V, in respect to the temperature $T_0$, pressure $P_0$ and the relative humidity $RH_0$ with the composition of substances with water present with an amount of no are mutually dependent. The wide arrow with the water chemical composition reference ($H_2O$) and with the phase indicating (g) is illustrating a water vapour flux from the room or space V towards to the construction element WE's surface, into it and through the concrete body CB, in such embodiments in which the water penetration has not been prevented contrary to those in which the water penetration is prevented by a suitable humidity stopping agent in the concrete body CB.

According to an embodiment of the disclosure, in the FIG. 7 example, there is indicated in the porous material compartment in the porous material Por a water delivery piping, with the respective label H2O(l) and reference numeral Tube. Accordingly, there are three circular dashed line drawn symbols with the reference numeral Tube, indicative of a piping to conduct water into the construction element WE, 102 to the porous material. A skilled person knows immediately from the embodiment, that the number or the direction (cf. FIG. 1 example) of the pipes is not limited only to the number in the shown example but can vary according to the detailed structure and size of the construction element. The dashed appearance of the pipe symbols Tube is indicative that the number as well as position and/or direction of them may vary between different elements as indicated, but also that these pipes can have perforated and/or porous surface to allow passage to the water from the pipes to the porous materials surrounding the pipes Tube, to provide water for the evaporation.

Although the pipes Tube have been drawn at the middle line of the porous material compartment and the porous material therein, the position can be varied from a construction element to another. According to an embodiment variant the pipes Tube can be mounted near to the surface of the holding layer 105, i.e. in the third part as counted from the holding layer 105 in the thickness direction through the porous material layer of the porous material compartment.

According to an embodiment variant, the construction element embodied can be manufactured to provide the porous material compartment for the porous material, which as embodied as sand, for example, can be added to the porous material compartment when the construction element as such, or a larger entity in the size is built together from a number of construction elements. The attachment between construction elements WE and/or WE2 can be made by protrusions and recesses as indicated by the reference numeral 103 for such wall-type elements as exemplified by the items WE, WE2 (FIG. 5) as well as similar attachments between such to roof elements RE, 102. The reference numeral 104 is referring to attachment means as protrusions and recesses for roof type elements RE, 102 as construction element WE embodiments, which can be embodied with a lighter structure than wall type elements, although bot embodiments can have similar cross section as indicated in the examples of FIG. 1 and FIG. 7. Both attachment means 103 and 104 can be embodied as pins as protrusions, to be used in correspondingly pin-sized recesses in the elements, with appropriate number and placement of the pins and recesses in the construction element.

According to an embodiment variant the attachment means can be embodied independently each other, by using tongue-and-groove joints, 103, 104, in suitable part. The internal cross section of the roof element 102 in FIG. 7 has not being drawn to those elements 102 that are in horizontal position with the pins 104 attached, but the roof elements 102 as well as roof elements RE have the basic cross-sectional structure as indicated in the examples via FIG. 1 and FIG. 7.

When filling the porous material compartment of the entity so formed with the porous material, sand, the pipes Tube can be added to the desired positions for the water feeding. Accordingly, the optional piping as indicated by label Tube to B can be added in a same way to the desired position.

According to an embodiment, with the dashed-line way of drawing, it is indicative that the piping labelled Tube to B has porous surface to provide a passage for a liquid and/or gaseous material into the porous material, but for the presence of the Tube B also optionality. According to an embodiment the piping Tube to B is providing a feed line of an anti-microbe agent from an anti-microbe agent reservoir B (FIG. 9).

According to an embodiment variant such a piping Tube to B can be used also as an additional source of water for increased evaporation in high temperature conditions. The anti-microbe agent can be delivered by a flow in the pipe, maintained and/or dosed by a pump and a control valve C (FIG. 9) when attached to the null-energy system embodied in accordance of the present disclosure.

According to an embodiment, the holding layer 105 can be made of porous metal, but can be coated also by a solar cell material to provide the conversion means as solar cells Sc of a solar cell configuration to provide energy contribution for the pumps of the null-energy system and/or entity using the same. According to alternative positions, the solar cells Sc can provide a whole area of the holding layer, with the perforated structure as a custom-made solar cell with the perforation. According to an embodiment the solar cells can be mounted on certain area on to the holding layer 105, for example in alternating way with perforated areas and the solar cell reserved areas.

Although the position may be vertical for a wall element on such as WE2 for example, the added electricity so produced may be not optimal but sufficient to have contribution being added to the total production, and in low elevation sun shine may contribute to the extended electricity production for the pumps and/or accumulation of the energy into rechargeable batteries, as parts of the solar cell configuration.

In FIG. 7 as well as in FIG. 8, the wide arrows drawn with dashed lines are indicative of water fluxes in form of water vapour (g). Some of that kind of arrows are drawn to start from the porous material compartment and the porous material therein, when in operation, so indicating that the feed of water in liquid form via the piping Tube, is experiencing a phase transition in the porous material, mainly near the holding layer 105, where the outside coming heat is available to warm up liquid form water and to evaporate in the corresponding temperature, utilising the partial vapour pressure in such conditions in the prevailing temperature, to the form of water vapour to be released through the holding layer 105 perforation pores. According to an embodiment, the water property to have a partial vapour pressure also in all temperatures below the boiling point (100° C. in normal conditions), is used as well as the exponential dependence on the temperature of the water in liquid form, to produce water vapours.

According to an embodiment variant, there can be also a second holding layer 106, which can be embodied by a molecular sieve to allow one directional passage for the water in gaseous form from the concrete body CB to the porous material Por, but not backwards, the backwards direction being prevented by the molecular sieve of the second holding layer 106.

With reference to the FIGS. 7 and 8, there is also indicated on the roof element 102 triangular water channels ($H_2O$) having the reclined side comprising a solar cell Sc on such surface. These triangular water channels being used as solar heater channels can be embodied as parts of the roof elements 102 (RE, too) surface, to provide warm or heated water by the circulation through these channels. In addition to taking the heat at their location site of the mount, the channels can also cool the surfaces of the solar cell back sides to improve the conversion efficiency of the solar cells by taking heat from the solar cells to the water circulation of this kind of embodied solar heater.

The end piece with embodied form of triangle at the corner of the construction elements WE (vertical) and 102 (horizontal or diagonal, cf. FIG. 11 embodiments of such) with the marking Air, is embodied as a channel to be used in equalising the pressure and facilitate concentration gradient equalising, as well as operation as spare route for water to soak the construction element's porous material Por in the porous material compartment, if such a need were observed. Such a channel can provide water to the corner to provide water to the connected construction elements with perforation/piping thereto.

According to an embodiment such end piece can be perforated from the sides that are towards the construction elements WE, 102, so to operate also as bridging between the construction elements, but also in suitable part to operate as a pressure equaliser, in situations where the evaporation is about to change from a first state rate to a second state rate, especially if there were extra water being left and pumped before the system would adapt to the changed conditions and equilibrium therein for the operation.

With reference to the FIG. 8, the example is indicative of a similar corner implementation as indicated in FIG. 7 by the embodied construction element implementation, which additionally in FIG. 8, for an optional embodiment to add, further comprises a lip system 101a-101c to shadow the wall for equalising the surface temperature of the evaporative surface of the holding layer 105. However, such lips 101a-101c can be used as extra area to mount solar cells Sc in reclined position, towards the maximum solar radiation, so to improve the electricity production compared to the mere vertically positioned solar cells. The triangular shape is an example to provide the lips, with support to the holding layer 105, but can be embodied without such, but having correspondingly stronger structure for the lips 101a-101c.

In FIG. 8 the embodied lip formations 101 can have also a chute or channel arranged for dropping water droplets, which may form onto the surfaces of the lips 101 at the shadow side of them, while evaporation is going on through the pores of the holding layer 105 and the water condenses onto the back side. The chutes can be arranged to collect the so obtained water to be pumped back to the used from the water reservoir. With reference to the embodiments apparent from the FIG. 9, which is embodying a null-energy system 900 using an embodied construction element WE, WE2, RE, 102, WEi, WEj or a composition of selected product forms of such ΣWE.

According to an embodiment, such system 900 comprises an ensemble of construction elements according to the applicable selection to form an entity thereof as indicated in the FIGS. 1 to 8, with the optional implementations in applicable part selected for the presence. Such a system 900 can comprise filters F to filtrate the water F as well as to filtrate F0 anti-microbe agent feeds, to remove impurities from the flow, so to keep the pores of the porous materials in the porous material compartment in operational conditions to pass water to the holding layer by the capillary forces and through the pores as evaporated, to minimise the risk of clogging the porous material and the capillaries inside such. According to an embodiment the filters are also protecting the pumps (Pump) as well as the pipes to get dirty. According to an embodiment filter F0 can be embodied as attached to the construction element WE.

According to an embodiment the water flow can be adjusted by the pump, in control of a thermostat Th(V) being mounted into the volume, whose cooling is intended to be controlled. The capital C with the arrow is indicative of a valve to be used in controlling the flow through the corresponding pipes at the dedicated position of the system structure pipes, which are drawn by double line to illustrate pipes. Small arrows are illustrating the flow or flux direction.

The anti-microbe agent line with the pump and the related control valve C has been drawn by dashed line to indicate optional embodiment with these parts. Similar optionality is indicated also for the lips 101 as well as the chute system to collect, filter and pump the collected water back to the reservoir.

The pumps are drawn close to the apparent reservoirs of water and anti-microbe agent, but in an alternative embodiment they can be situated further away to be so included in a diversified manner via feed line pipes to the null-energy system.

According to one embodiment variant, tab water can be used in suitable part, where applicable.

The solar panels Sc in the system 900 can be embodied on the surfaces as indicated in the FIGS. 1, 7 and 8 embodiments. The solar panel Sc near the marking Sun at left in FIG. 9 has been indicated to provide electric power by the label kWh, to indicate electricity production for the system parts, especially the pumps. The solar panel Sc can have at the panel the necessary solar panel configuration to provide the electricity to the pumps. Such configuration can comprise also accumulators to provide electricity stored to the moments of no Sunshine available, but the pumps to be used. At the upright corner the solar panel Sc can be diversified to the roof for example, on to the solar heater pipe surfaces as illustrated in FIGS. 7, 8, 9, and 11, with the insert in FIG. 11. Hot water pump in the system can be used to circulate water through the solar heater pipes, to take heat and so cool the solar heater surfaces, also the solar cells on such surfaces, and circulate the water to a hot water delivery reservoir, which can be in an alternative embodiment connected to the water reservoir of the cooling line of water to be pumped to the porous material. The water flow can be controlled by a controller valve C. The symbols e-with the apparent arrows are used to illustrate electrical power transference, without taking position to the electron movement direction as such.

Water vapour flux from the construction element WE surface is schematically indicated in FIG. 9 by an ensemble of six arrows below the marking $H_2O(g)$ as directed away from the porous material Por in the porous material compartment of the construction element WE.

FIG. 10 is illustrative of sand particle size (DP) distributions of the porous material as embodied by sand as such, illustrated by a composition 1000 of sand particle size distribution as modes for the sand particles. In FIG. 10 the particle size has been shown on logarithmic axis as used to be in connections of particle size distributions. The particle mass at given size has been indicated on the vertical axis, to follow a log-normal size distribution notation. The vertical bar at the right side of the Mode 2 is indicative an example in which the sand particle follow a size distribution of a composition of the modes Mode 1 and Mode 2 as the main modes of the sand particle size distributions. The 90% threshold has been marked, and accordingly in the shown example 90% of the sand particles are smaller in mass than that at the threshold size.

In FIG. 10 there are indicated as examples of arbitrary illustrative modes, Mode 1, Mode 2, to exemplify as such that the sand as the porous material can be particular dedicated sand as a mixture of sands that have different sized sand particles, the mixture being composed of an ensemble of particles in the modes, so to have the capillary forces based suction as a consequence of the evaporation being optimised.

According to an embodiment such a particle size distribution represent a mode of the porous material, which can be a composition of several embodied modes, each mode with a specific weight in the so formed multimodal porous material size distribution. According to an embodiment variant, the modal width and symmetry of fine sand particles mass size distribution whose particles size can follow so called self-preserving distribution in the shape, especially the width, which is considered as a shape parameter rather than having connection to the aggregation.

With reference to the FIG. 11, an entity 1100 is made of embodied null-energy system 900 comprising several product forms of construction elements WE, as put together to form a building, whose interior (see V in FIGS. 7 and 8, for example) can be cooled according to an embodiment of the system 900. The entity 1100 in the example comprises an entity consisting of a wall single element WE2 (FIG. 2, FIG. 5) at least at one side which is an outer wall. At the head end the building has a similar wall element WE2 but made into triangular form for the mount position geometry to fit to the roof formation. The entity 1100 has also a wall element, which is implemented by using product form of brick-like embodiment WE as in composition entity EWE below said head end. In the example the roof element 102 has been used, with a number of triangular solar heater tubes with solar cells thereon, on the reclined surface towards the Sun. Although the shown shape of the building in FIG. 11 is given as an example, other forms of walls as embodied in FIG. 5 by the exemplified curvature and/or alternatives of flat roofs as embodied in FIG. 6 for example can be used to compose alternative entities to an entity 1100 as a building to be cooled by an embodied null-energy system 900 being embodied by the composition of different kind of construction elements WE, WE2, WEi, WEj, ΣWE, 102, RE.

An accordingly embodied building 1100 can have also as an alternative power source a wind turbine WT (cf. FIG. 12), which is illustrated by the ellipse on the WE2 element as a flow entrance or exit for the wind turbine, in the example being hidden to the roof structures, because of scenery-related reasons or rules for the buildings etc. to be locally obeyed.

In FIG. 12 there is schematically indicated a null-energy system 1200 according to an embodiment of the present disclosure. The system 1200 is based on the system 900 as can be embodied basically as in FIG. 9 illustrated with the alternative embodiment variants as such. The embodied system can be such a building as embodied in FIG. 11 related examples, or a part of such a building 1100, i.e. a wall or roof part which is positioned towards a desired point of a compass. In such embodiment alternatives that have solar cells on the construction elements on their surfaces in the system 900, the direction can be towards the sunlight maximum to provide maximum amount of solar power.

However, in the alternative embodiment example 1200 in FIG. 12 there is embodied an alternative power source wind turbine WT, to be used alternatively or in supplement to the solar cells Sc. The way of drawing is indicative that the null-energy system 1200 as embodied can additionally have several wind turbines within the system 900. According to an embodiment variant, the wind turbines WT, which are arranged to generate electricity from air flows near and/or through the system 1200, for example a building or a part thereof, can be embodied as hidden type being mount into tubular forms that hide wind turbines into the structures of the building 1100, but leave passage to the wind to the turbine to be rotated and the consequential electricity being produced for the system needs, such as the operation of the pumps and battery re-charges, for example.

According to the way of drawing, the number of wind turbines is not limited in the system 1200. One of the wind turbines WT has been drawn partially out of the system 900 illustrative lines, which might be the case for an implementation to an embodied building with air conditioning pipes extending outwards from the building, or, can be positioned on roof in a hidden position not to be visible from the ground, because of a wall between line of sight and the wind turbine on a penthouse patio, for example. Consequently, a skilled person may on the basis of this disclosure and general knowledge apply the provided teachings in order to implement the scope of the present invention as defined by the appended claims in each particular use case with necessary modifications, deletions, and additions.

The invention claimed is:

1. A construction element of a null-energy system, the construction element comprising:
   a body; and
   a porous material compartment with porous material to store water, the porous material compartment being disposed on the body, the porous material compartment with porous material having a delivery piping of an anti-microbe agent, the delivery piping being disposed within the porous material of the porous material compartment, said delivery piping connecting the porous material compartment to a reservoir of the antimicrobe agent, the porous material compartment comprising a first holding layer on an opposite side of the porous material compartment in relation to the body, the stored water evaporating outwards from the porous material of the porous material compartment through the first holding layer.

2. The construction element of a null-energy system of claim 1, wherein the porous material compartment comprises a second holding layer disposed between the porous material and the body, the second holding layer being configured to hold water as a molecule sieve to provide one direction transfer through the body for the water towards the porous material compartment.

3. The construction element of a null-energy system according to claim 1, wherein the porous material compartment additionally comprises at least one water supply to internally supply liquid water, into the porous material compartment with the porous material therein, from a water reservoir.

4. The construction element of a null-energy system according to claim 1, further a surface with solar cell comprising configuration on said construction element surface.

5. The construction element of a null-energy system according to claim 1, wherein the first holding layer comprises an ensemble of pores being configured to evaporative water through said pores in the holding layer.

6. The construction element of a null-energy system according to claim 1, further comprising a lip to provide a reclined surface for a solar cell.

7. The construction element of a null-energy system according to claim 6, wherein said lip has a condensation surface facing away from the solar cell, the condensation surface being configured to catch, save, and/or channel evaporating water to condense onto said lip surface.

8. The construction element of a null-energy system according to claim 6, wherein the lip surface comprises a channel or tubular formation to circulate condensed water underneath the solar cell surface to cool the solar cell by taking heat to the circulating water.

\* \* \* \* \*